United States Patent

Herrick

[15] 3,652,355

[45] Mar. 28, 1972

[54] METALLIC LAMINATED STRUCTURE AND METHOD

[72] Inventor: Catlyle S. Herrick, Alplaus, N.Y.

[73] Assignee: General Electric Company

[22] Filed: Mar. 12, 1970

[21] Appl. No.: 19,087

[52] U.S. Cl..........................156/151, 117/62.2, 117/132 B, 117/161 P, 156/306, 161/214, 204/181
[51] Int. Cl. ......................C09j 5/06, C09j 3/14, C23b 13/00
[58] Field of Search..................161/227, 214, 219; 204/181; 156/331, 332, 150, 151, 306

[56] References Cited

UNITED STATES PATENTS

| 3,179,631 | 4/1965 | Endrey | 156/331 UX |
| 3,179,633 | 4/1965 | Endrey | 156/331 UX |
| 3,336,258 | 8/1967 | Angelo | 161/227 |
| 3,349,061 | 10/1967 | Pruckmayr | 161/227 |
| 3,448,068 | 6/1969 | Holub et al. | 204/181 |
| 3,486,934 | 12/1969 | Bond | 161/227 |
| 3,507,765 | 4/1970 | Holub | 204/181 |

Primary Examiner—Willard E. Hoag
Attorney—Charles T. Watts, Paul A. Frank, Jane M. Binkowski, Frank L. Neuhauser, Oscar B. Waddell and Joseph B. Forman

[57] ABSTRACT

A metallic polyimide-bonded laminated structure having enhanced bonding between the laminae and the intermediate polyimide binder. This structure is formed by electrocoating at least one surface of one lamina with an electroconducting solution or emulsion of a polyamide acid and heating the coating to convert the polyamide acid to the polyimide. A composite of the resulting coated metal is formed with a second metallic lamina, and it is heat-compressed to form the laminated structure. The curing or conversion of the polyamide acid to the polyimide is carried out so that any water of imidization liberated during the heat-compression is insufficient to form an adhesively-weakening amount of metallic oxide of the laminate.

7 Claims, No Drawings

METALLIC LAMINATED STRUCTURE AND METHOD

This application relates to the art of fabricating metallic laminated bodies. Specifically, it relates to a novel process for making laminated structures having improved physical properties, as for example, a greater resistance to adhesive failure, and is also concerned with the unique articles resulting from this process.

Conventionally, laminated structures are comprised of laminae, which may be selected from a variety of materials, held together by a suitable binder, usually a synthetic resin or polymer. The present invention relates to structures having metallic laminae with an intermediate layer of a polyimide as a binder. A particular problem of prior art laminated structures of polyimide-bonded metal laminae has been separation under tension along the metal-polymer interface. Thus, the adhesive bond between the polymer and the metal is weaker in tension than the cohesive bond and this has severely limited the utility of these structures.

I have discovered that this tensile strength shortcoming of such structures can be overcome easily and economically and without incurring any significant offsetting disadvantage. This result is obtained reliably and reproducibly through the new method of my present invention involving electrocoating of the polyamide acid and predicated upon my discovery of the critical relationship between the polyamide acid-polyimide conversion reaction and the final step of heat compressing the laminated assembly. In particular, I have found that by carrying the polyimide formation reaction to completion or nearly to completion before the final step, one can produce a structure which has greatly increased tensile strength. In fact, structures produced in accordance with this invention ultimately fail under tensile stress cohesively rather than adhesively, i.e., the polymer-metal bond remains intact as the polymer layer itself pulls apart. Thus, in the new structures of this invention, the polymer-polymer (cohesive) bond is significantly stronger than the metal-polymer (adhesive) bond of the prior art structures, but is also weaker than the metal-polymer bond of these new structures.

In explanation of this unique result, I have observed that the adhesive failure of prior art metallic polyimide-bonded laminated structures is due to the presence of metallic oxide. Specifically, in curing the polyamide acid to the polyimide, water is liberated chemically. For example, polyamide acid formed by the reaction of m-phenylene dianamine with 3,3',4,4'-benzophenonetetracarboxylic dianhydride (BPDA) is composed of recurring units of the formula:

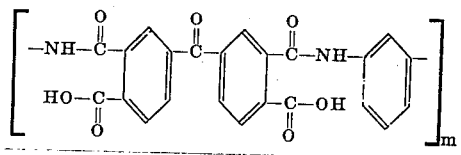

After curing, the resulting polyimide is composed essentially of recurring units of the formula:

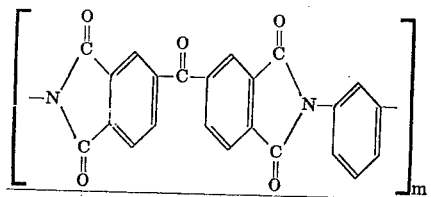

where $m$ is a whole number in excess of 1, e.g., up to 10,000 or more. Two molecules of water are liberated by the complete imidization of each recurring unit.

In the past, in forming metallic laminates, I believe that the high heating temperatures (125° to 300°C.) required during lamination to carry out imidization to substantial completion and form the laminate have caused the water liberated by the imidization to attack the metal during heat-compression to generate the metal oxide. Apparently, the amount of such metal oxide has been sufficient to prevent formation of the strong adhesive bond desired for a number of applications.

According to the present invention, metallic polyimide-bonded laminated structures having unexpectedly strong resistance to adhesive failure are produced by initially electrocoating the polyamide acid on the metal, and prior to lamination curing the polyamide acid to form the polyimide. The process of the present invention then briefly stated comprises electrocoating a polyamide acid solution or emulsion on at least one surface of a metallic lamina, heating said coated lamina to substantially convert the polyamide acid to the polyimide, forming a composite of the resulting polymer-coated metallic lamina with another metallic lamina, and heat-compressing said composite at a temperature and pressure at which the polyimide bonds to form a laminate. The curing or conversion of the polyamide acid to the polyimide is carried out so that any water of imidization liberated during the heat-compression is insufficient to form an adhesively-weakening amount of metallic oxide in the laminate. The resulting laminated structure, under stress, fails predominantly, i.e., at least ¾ of the bonded surface area, by cohesive failure rather than adhesive failure.

The polyimide of the present laminate is formed from electroconducting solutions or emulsions of a polyamide acid. Representative of the electroconducting polyamide acid solutions or mixtures useful in the present invention are those disclosed in U.S. Pat. No. 3,448,068, U.S. Pat. Applications Ser. No. 548,000, filed May 5, 1966 now U.S. Pat. No. 3,507,765 in the name of Fred F. Holub, Ser. No. 747,460, filed July 25, 1968, in the names of Fred F. Holub and John T. Hoback, and Ser. No. 810,884, filed Jan. 13, 1969 in the names of Fred F. Holub and Richard F. Gaertner, now U.S. Pat. No. 3,537,970 all assigned to the assignee of the present invention, and all of which, by reference, are made part of the disclosure of the present application.

Specifically, in U.S. Pat. Application Ser. No. 548,000, filed May 5, 1966, there is disclosed a process for making an electroconducting polyamide acid solution or mixture which comprises (1) forming in water a mixture of ingredients comprising (a) at least one dianhydride selected from the group consisting of benzophenone dianhydride (e.g., 2,2',3,3'-, 2,3,3',4'-, 3,3',4,4'-benzophenonetetracarboxylic acid dianhydride), pyromellitic dianhydride, ethylene glycol bis trimellitate anhydride, and a dianhydride having the formula:

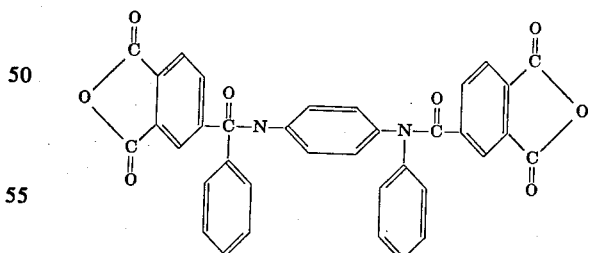

(b) at least one diamine selected from the group consisting of $C_{2-8}$ alkylenediamines, m-phenylenediamine, and diamines having the formula:

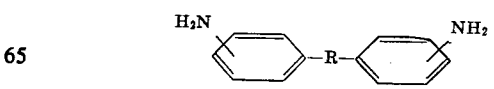

where R is a divalent radical selected from the group consisting of $C_{1-3}$ alkylene,

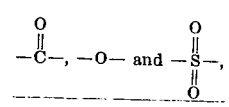

and (c) a water soluble amine selected from the group consisting of tertiary amines, and tertiary amines with secondary amines, and (2) allowing the reactants to interact at a temperature below 40° C., e.g., from 20° C. to ambient temperatures, such as 25° to 30° C., to form the polyamide acid substantially free of any polyimide groups derived from the polyamide acid. The patent discloses that the polyamide acid remains soluble in a water solvent even at room temperature and has a low solution viscosity if there is incorporated in the solvent as the additive a water soluble tertiary amine, such as pyridine, dimethylethanolamine, N,N,N',N'-tetramethylbutanediamine, etc., or such a tertiary amine with a water soluble secondary amine, such as diethylamine, morpholine, etc. As a further advantage of incorporating the amine additive in the above-described polyamide acid solution, it has been found possible to use the above conducting polyamide acid solutions for electrocoating the polyamide acids on metal substrates. These electrically deposited films can then be cured by the application of heat (about 150° – 300° C.) to form adherent polyimide coatings that serve as electrical insulation at high temperatures, have exceptionally high dielectric breakdown strength and protect the substrates against corrosion.

In U.S. Pat. No. 3,448,068 there is disclosed a process for making a polyamide acid solution which comprises (1) dissolving a mixture of ingredients comprising (a) at least one carbonyldiphthalic carboxylic acid dianhydride (hereinafter referred to as "dianhydride") selected from the class consisting of the various benzophenone dianhydrides (e.g., 2,2',3,3'-, 2,3,3',4'-, 3,3',4,4'-benzophenonetetracarboxylic acid dianhydride) and a dianhydride having the formula:

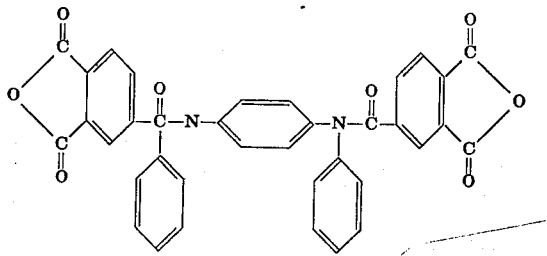

with (b) at least one diamine selected from the group consisting of $C_{2-8}$ alkylenediamines, m-phenylenediamine, and diamines having the formula:

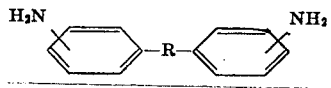

where R is a divalent radical selected from the group consisting of $C_{1-3}$ alkylene,

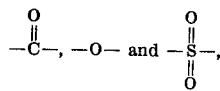

, in a solvent mixture composed of phenol and water in which the water is present in an amount equal to at least about 12 percent, by weight, based on the total weight of the phenol and water, the amount of water being so employed as to maintain the solution in a liquid condition at ambient temperatures, and (2) allowing the reactants to interact at a temperature below 40° C., e.g., from 20° C. to ambient temperatures, such as 25° to 30° C., to form the polyamide acid substantially free of any polyimide groups derived from the polyamide acid. This patent also discloses the incorporation of ammonium compounds to permit the use of larger amounts of water in the solvent (in excess of 29 percent, by weight) and to enable such solutions to be employed for electrocoating of substrates. Examples of these ammonium compounds are ammonia, ammonium formate, ammonium acetate, etc.

In U.S. Pat. Application Ser. No. 747,460, filed July 25, 1968 there is disclosed a process for making a polyamide acid solution which comprises dissolving at least one organic diamine having the formula $H_2N-R'-NH_2$ wherein R' is a divalent organic radical containing at least two carbon atoms, each of the amino groups being attached to separate carbon atoms of the divalent radical in a solvent comprising at least 40 percent by weight of an aliphatic polyol and adding to said solution at least one organic benzenoid dianhydride having the structural formula:

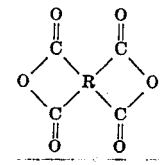

wherein R is a tetravalent organic radical containing at least one ring of six carbon atoms, said ring characterized by benzenoid unsaturation, the four carbonyl groups being attached directly to separate carbon atoms in a ring of the R radical, and each pair of carbonyl groups being attached to adjacent carbon atoms in a ring of the R radical, said diamine and said dianhydride being employed in approximately equal molar quantities, while maintaining the temperature below 100° C. whereby said diamine and said dianhydride react to produce a polyamide acid solution.

Additional electroconducting polyamide acid solutions which by reference are made part of the disclosure of the present application are disclosed in U.S. Pat. Application Ser. No. 822,899, filed May 8, 1969, in the name of Marvin Arthur Peterson and entitled "Improved Process For Producing Wire Coatings From Perpolymeric Materials," U.S. Pat. Application Ser. No. 823,108, filed May 8, 1969, in the name of Marvin Arthur Peterson and entitled "Improved Process For Producing Polyamide Coating Materials," U.S. Pat. Application Ser. No. 803,037, filed Feb. 27, 1969, in the name of Marvin Arthur Peterson and entitled "Improved Process For Producing Coating Materials," and U.S. Pat. Application Ser. No. 851,835, filed Aug. 21, 1969, in the name of Marvin Arthur Peterson and entitled "Improved Process for Producing Polyamide Coating Materials By Endcapping."

The metallic laminae of the present laminates can vary widely in form and metallic composition. Representative of the metals which form oxides more readily, and therefore, would show improved resistance to adhesive failure according to the present process are copper, iron and aluminum.

In the present process, at least one surface of the metallic lamina is electrocoated with electrically conducting polyamide acid solutions or emulsions. The term "electrocoating" as used herein is intended to mean a process whereby organic coatings are formed from electrically conducting polyamide acid solutions or emulsions on electrically conducting surfaces of the metallic lamina by the action of an electric current. The metallic surface on which deposition of the organic material i.e., the polyamide acid, occurs functions as an electrode. This electrode, in addition to another of opposite polarity, is immersed in a conducting electrocoating bath within which an imposed electric potential causes migration of the charged organic molecules, or in some cases, colloidal particles, to effect rapid deposition of the polyamide acid resins on the substrate being coated. In the present case, the electric coating bath was a polyamide acid solution in which negatively charged polymer molecules deposit on the anode.

Specifically, the electrocoating method forms coatings which are continuous, substantially uniform, and have a high solids content as contrasted to conventional method such as dip coating where an uneven coating having a low solids content and high solvent content is deposited. Electrocoating is also particularly advantageous because of the excellent adhesion obtained with the substrate and because relatively thick films may be obtained in one operation in a matter of seconds. Furthermore, fresh electrocoated films contain much less solvent than wet solution-cast films, and for this reason would not require as extensive a heating period for removing residual solvent.

In carrying out the process of the present invention, the electrocoated metal is heated to substantially imidize the polyamide acid. The imidization should be extensive enough so that any small amount of water which may be liberated by imidization during lamination is insufficient to react with the metallic laminae to form the metal oxide in any significant amount. By a significant amount of metal oxide, it is meant herein an amount which weakens the adhesive bond, i.e., an amount sufficient to cause adhesive failure in the laminate under stress. Generally, for the aromatic polyamide acids disclosed in the cited U.S. patents, such imidization of electrocoated films can be carried out to substantial completion at temperatures ranging from about 125° to 300° C. Preferably, a program of increasing temperatures is used terminating within the specified temperature range to accomplish the imidization within a reasonable period of time, i.e., up to about 30 minutes or longer. For best results, depending largely on the chemical nature of the metallic laminae, in excess of 90 percent of the polyamide acid should be imidized before lamination and preferably in excess of 95 percent. The extent to which imidization has been carried out is determinable by a number of methods available in the art. For example, an indication of the extent of imidization may be made by conventional reflecting infrared techniques using self-supporting films but such technique may be accurate only within about 10 percent. Rates of imidization for a number of polyamide acids are available in the art, as for example, J.A. Kreuz, A.L. Endrey, F.P. Gay, and C.E. Sroog, J. Polymer Science, A-1, Vol.4, 2,607(1966). In addition, the extent of imidization may be determined empirically by the adhesive strength of the resulting laminate as well as the presence of metal oxide at the metallic interface of the laminate.

The laminate can be formed in a conventional manner. For example, a composite of the cured coated metallic lamina with a second metallic lamina, with the coating intermediate the laminae, can be formed and heat-compressed in a conventional manner. Alternatively, a composite of the cured coated lamina can be formed with a second such cured coated lamina, with the coatings intermediate the laminae, and heat-compressed by conventional techniques.

The temperatures and pressures used to form the laminates can vary and are determinable empirically. Specifically, temperature and pressure conditions should be such as to enable intimate contact of the bonding surfaces during lamination over the entire area to be bonded. The particular pressure used, to a large extent, depends upon the stiffness of the metallic laminae, and to a lesser degree, on the thickness of the polymer coating. Although with sufficient pressure lamination could be carried out at room temperatures, for practical purposes, it is generally carried out at a temperature which promotes intimate contact of the surfaces to be bonded, i.e., generally the higher the temperatures the less rigid are the metallic laminae. In addition, the higher temperatures induces some flow in the polymer coating to further promote intimate contact of the bonding surfaces. The temperatures used to carry out the lamination, however, should not be so high as to decompose the polymer to any significant extent. Generally, satisfactory bonding is obtained at temperatures substantially below the cut-through temperatures which fall generally in the area of about 400° C. In practice, for a majority of the present metallic laminates, temperatures ranging from about 125° to 350° C. are satisfactory.

The outstanding properties of aromatic polyimides permit them to be used in many applications where other materials would fail. A few of these properties are high temperature THERMAL stability, good resistance to radiation, high mechanical strength, resistance to most chemicals and solvents, good flexibility, and excellent electrical insulation properties, The metallic laminates of the present invention, therefore, would be useful in the fabrication of stators and rotors for electric motors. They also have high utility for such uses as sealing vacuum devices such as electronic tubes replacing metal welds for pumps and other devices, sealing lamp bases, and general adhesive applications for aircraft and space vehicles as well as transforming devices using laminates in their magnetic circuits.

In order that those skilled in the art may better understand how the invention may be practiced, the following examples are given by way of illustration and not by way of limitation. All percentages are, by weight, unless otherwise stated.

EXAMPLE 1

The electrocoating solution used was prepared by initially adding 60 grams of distilled water to 174.5 grams of a 90 percent by weight phenol-10 percent by weight water solution and warming it to 45° C. 33.7 grams of 4,4'-methylene dianiline were then added to the solution which was then stirred in a Waring blender for 1 minute. 53.7 grams of 3,3',4,4'-benzophenonetetracarboxylic acid dianhydride (BPDA) were then added to the solution which was stirred again in a Waring blender for 1 minute. 21.5 grams of ammonium hydroxide along with 540 grams of distilled water were then added to the solution and blended for 15 minutes at a temperature of 40° to 45° C. The solids concentration in the solution was 10 percent. The electrocoating solution was placed in a glass electrocoating vessel supplied with agitation means.

Four pieces of cube-on-edge silicon iron from 0.011 inch by 1 3/16 inches by 4 inches were used as laminae. The surfaces to be bonded were cleaned in a detergent solution, degreased in trichloroethylene vapor and then sandblasted to remove any oxide scale. The iron pieces were electrocoated with the polyamide acid electrocoating solution at 45 volts for 20 seconds by immersing them in the solution and making them the anode while the cathode was a 3/6 stainless steel cylinder which was 12 inches long and had an inner diameter of 2 inches. The anode was located axially with respect to the cathode. The "drip" coat of electrocoating solution was then removed by rinsing the coating with water. The thickness of the coating on each iron piece was 0.6 mil.

Two of the coated pieces were placed in an oven and heated for 30 minutes at a temperature of 115° C. to drive off solvents. A sandwich was made of the two pieces with the coatings intermediate the metal and placed in a Carver press which had been preheated to 250° C. A pressure of 1,000 p.s.i. was applied for 5 minutes, after which the resulting laminate was removed from the press and cooled to room temperature in air. The laminate was then tested for peeling strength by manually attempting to separate the metallic laminae. Little tensile force was required to separate the laminae and bending of the metal was not required. Examination of the separated laminae showed that all around the peripheral area of the joint the principle mode of failure was cohesive. However, the entire internal bonded area failed by adhesive failure, i.e., separation at the metallic interface, and iron oxides were visible at the adhesively separated metallic interface.

The remaining two coated iron pieces were placed in an oven for 30 minutes at 125° C. and were then heated for 15 minutes at 250° C. A sandwich was made of the laminae with the coatings intermediate the metal and placed in a Carver press which had been pre-heated to a temperature of 350° C. A pressure of 1,000 p.s.i. was applied for 5 minutes, after which the resulting laminate was removed from the press and cooled to room temperature in air.

This second laminate was tested in the same manner for peel strength as the first laminate by manually attempting to separate the metallic laminae. The force required to cause separation was much greater than before and separation could be achieved only by a strong peeling action during which the laminae were bent almost 90°. Examination of the separated laminae showed the mode of failure to be cohesive, i.e., failure within the polymer over the entire bonded area.

What is claimed is:

1. The process for bonding metallic laminae by means of a polyimide to form a laminated structure which fails under stress predominantly by cohesive failure of the bonded area rather than adhesive failure which comprises providing an electroconducting aqueous solution or emulsion of an aromatic polyamide acid, said polyamide acid liberating water when converted to the corresponding polyimide, providing electrically conducting laminae formed of a metal which oxidizes in contact with water at temperatures ranging from 125° to 300° C., immersing at least one of said laminae in said polyamide acid solution or emulsion to serve as an anode, depositing a continuous coating of polyamide acid from said polyamide acid solution or emulsion on said immersed lamina by imposing an electric potential within said solution or emulsion to cause migration of negatively charged polyamide acid molecules to deposit on the immersed lamina-anode, polyamide acid coated lamina at a temperature ranging from about 125° to about 300° C. to convert in excess of 90 percent of said polyamide acid coating to the polyimide coating, forming a composite of the polyimide coated lamina with a second of said metallic lamina with said polyimide coating intermediate the laminae, and heat-compressing said composite at a temperature ranging from about 125° to 350° C. under a pressure which enables intimate contact of the bonding surfaces over the entire area to be bonded to form a laminated structure.

2. A process according to claim 1 wherein both of the metallic laminae to be bonded are provided with said polyimide coating and said composite is formed with said polyimide coatings intermediate said metallic laminae.

3. A process according to claim 1 wherein said metallic laminae are formed of a metal selected from the group consisting of copper, iron and aluminum.

4. A process according to claim 1 wherein said aromatic polyamide acid is the reaction produce of methylene dianiline and 3,3′, 4,4′-benzophenonetetracarboxylic acid dianhydride.

5. A process according to claim 4 wherein said metallic laminae are formed of iron.

6. A process according to claim 1 wherein said aromatic polyamide acid is the reaction product of methylene dianiline and 3,3′, 4,4′-benzophenonetetracarboxylic acid dianhydride.

7. A process according to claim 6 wherein said metallic laminae are formed of iron.

* * * * *